United States Patent
Kang et al.

(10) Patent No.: US 8,627,487 B2
(45) Date of Patent: *Jan. 7, 2014

(54) METHOD AND APPARATUS FOR PROVIDING DRM SERVICE

(75) Inventors: Bo-Gyeong Kang, Seoul (KR); Byung-Rae Lee, Seoul (KR)

(73) Assignee: Samsung Electronics Co., Ltd. (KR)

(*) Notice: Subject to any disclaimer, the term of this patent is extended or adjusted under 35 U.S.C. 154(b) by 12 days.

This patent is subject to a terminal disclaimer.

(21) Appl. No.: 13/269,230

(22) Filed: Oct. 7, 2011

(65) Prior Publication Data
US 2012/0090036 A1    Apr. 12, 2012

(30) Foreign Application Priority Data
Oct. 7, 2010   (KR) .................. 10-2010-0098001

(51) Int. Cl.
*G06F 7/04* (2006.01)
(52) U.S. Cl.
USPC ................................ 726/26; 380/201; 705/57
(58) Field of Classification Search
USPC ............... 726/26, 27; 705/50, 51, 57, 59; 709/231; 380/201
See application file for complete search history.

(56) References Cited

U.S. PATENT DOCUMENTS

| | | | |
|---|---|---|---|
| 8,255,964 B2* | 8/2012 | Brown et al. | 725/110 |
| 2004/0133632 A1* | 7/2004 | Messerges et al. | 709/203 |
| 2005/0086501 A1 | 4/2005 | Woo et al. | |
| 2010/0058061 A1* | 3/2010 | Folta et al. | 713/171 |
| 2012/0011596 A1 | 1/2012 | Kim et al. | |
| 2012/0023251 A1* | 1/2012 | Pyle et al. | 709/231 |

FOREIGN PATENT DOCUMENTS

| | | |
|---|---|---|
| JP | 4039489 | 1/2008 |
| KR | 1020080039150 | 5/2008 |
| KR | 1020090056126 | 6/2009 |
| KR | 100930303 | 12/2009 |

OTHER PUBLICATIONS

Thomas Stockhammer, "Dynamic adaptive streaming over HTTP—: standards and design principles" 2010.*

* cited by examiner

*Primary Examiner* — Samson Lemma
(74) *Attorney, Agent, or Firm* — The Farrell Law Firm, P.C.

(57) ABSTRACT

An apparatus for providing a Digital Rights Management (DRM) service includes a Media Presentation Description (MPD) information configurer for determining a DRM system required in each of representations of content provided by an adaptive streaming service, classifying the representations into one or more groups according to predetermined criteria, and configuring MPD information by inserting content protection information including representation group information representing classified groups and information about DRM systems corresponding to the representation group information; and a communication unit for transmitting the MPD information to a user terminal receiving the content.

16 Claims, 9 Drawing Sheets

```
<Period start="PT0S">
        <Representation
                mimeType="video/3gpp; codecs=s263, samr" bandwidth="256000">
                <ContentProtection>
                        <SchemeInformation schemeIdUri = OMADRM.uri/>
                </ContentProtection>
                <SegmentInfo duration="PT10S" baseURL="rep1/">
                        <InitialisationSegmentURL sourceURL="seg-init.3gp"/>
                        <Url sourceURL="seg-1.3gp"/>
                        <Url sourceURL="seg-2.3gp"/>
                        <Url sourceURL="seg-3.3gp"/>
                </SegmentInfo>
        </Representation>
        <Representation
                mimeType="video/3gpp; codecs=mp4v.20.9, mp4a.E1"
                bandwidth="128000">
                <SegmentInfo duration="PT10S" baseURL="rep2/">
                        <InitialisationSegmentURL sourceURL="seg-init.3gp"/>
                        <Url sourceURL="seg-1.3gp"/>
                        <Url sourceURL="seg-2.3gp"/>
                        <Url sourceURL="seg-3.3gp"/>
                </SegmentInfo>
        </Representation>
</Period>
```

FIG.1

```
<MPD>
<Period>
<Representation ID="1" Group="10"/>
<ContentProtection schemeIdUri="OMA" licenseInfos="" downlodableDRMInfo=""/>      ─ 62
<ContentProtection schemeIdUri="Marlin" downlodableDRMInfo=""/>
    <EmbededLicense>MarlinLicenseHere</EmbededLicense>
</ContentProtection>
<Segmenta:onEncryptionInfo algorithmID="0x01">                                     ─ 64
    <SampleEncryptionInfo initialVector="0x1111" sourceURL="seg-1sampleinfos" segRef="1"/>
    <SampleEncryptionInfo initialVector="0x1211" sourceURL="seg-2sampleinfos" segRef="2"/>
    <SampleEncryptionInfo initialVector="0x1231" sourceURL="seg-3sampleinfos" segRef="3"/>
</SegmentaionEncryptionInfo>
<SegmentInfo duration="PT10S" baseURL="rep1/">
    <InitialisationSegmentURL sourceURL="seg-init.3gp"/>
    <UrlsourceURL="seg-1.3gp" segNum="1"/>
    <UrlsourceURL="seg-2.3gp" segNum="2"/>
    <UrlsourceURL="seg-3.3gp" segNum="3"/>
</SegmentInfo>
</Representation>
</Period>
</MPD>
```

FIG.6

```
<MPD>
<Period>
<MediaCompositionGroups>
<MediaCompositionGroup ID="1">
    <ContentProtection schemeIdUri="A" licenseInfos=" " downlodableDRMInfo=" " description="video"/>   ─ 72
    <ContentProtection schemeIdUri="B" licenseInfos=" " downlodableDRMInfo=" " description="video"/>
    <ContentProtection schemeIdUri="C" downlodableDRMInfo=" " description="audio"/>
        <EmbededLicense>...</EmbededLicense>
    </ContentProtection>
<GroupInfo refID="1"/>  //Video
<GroupInfo refID="2"/>  //Audio
</MediaCompositionGroups>
<Representation ID="1" Group="1" bandwidth="128000">...</Representation>
<Representation ID="2" Group="1" bandwidth="256000">...</Representation>
<Representation ID="3" Group="2">...</Representation>
</Period>
</MPD>
```

FIG.7A

```
<MediaCompositionGroup ID="2" description="For Mobile">
    <ContentProtection schemeIdUri="A" licenseInfos=" " downlodableDRMInfo=" " description="low"/>        ─ 74
    <ContentProtection schemeIdUri="B" licenseInfos=" " downlodableDRMInfo=" " description="low,mid"/>
    <ContentProtection schemeIdUri="C" downlodableDRMInfo=" " description="high"/>
        <EmbededLicense>...</EmbededLicense>
    </ContentProtection>
<RepresentationInfo refID="1" description="low"/>  //160×120
<RepresentationInfo refID="2" description="mid"/>  //240×160
<RepresentationInfo refID="3" description="high"/> //320×240
</MediaComposition>
```

FIG.7B

```
<MPD>
    <ContentProtection schemeIdUri="A" licenseInfos="" downloadableDRMInfo="" description1="video" description2="low"/>
    <ContentProtection schemeIdUri="B" licenseInfos="" downloadableDRMInfo="" description1="video" description2="mid"/>
    <ContentProtection schemeIdUri="C" downloadableDRMInfo="" description1="audio, video"/>
        <EmbededLicense>...</EmbededLicense>
    </ContentProtection>
<Period/>
<Period/>
</MPD>
```

FIG.8

METHOD AND APPARATUS FOR PROVIDING DRM SERVICE

PRIORITY

This application claims priority under 35 U.S.C. §119(a) to a Korean Patent Application entitled "Method and Apparatus for Proving DRM Service" filed in the Korean Industrial Property Office on Oct. 7, 2010 and assigned Serial No. 10-2010-0098001, the contents of which are incorporated herein by reference.

BACKGROUND OF THE INVENTION

1. Field of the Invention

The present invention relates generally to Digital Rights Management (DRM) service, and more particularly, to a DRM service method and apparatus applicable to adaptive streaming service.

2. Description of the Related Art

DRM service is technology for continuously managing and protecting the intellectual property rights for digital content using encryption technology. In other words, this service is technology for securely delivering a variety of content from a Content Provider (CP) to a user, and preventing the user from illegally distributing the provided content. The DRM technology may protect the information throughout the entire process including creation, distribution, use and disposal of digital content, and may protect the user's rights not only in the online environment but also in the offline environment. Currently, various different DRM systems are available in the market. For example, such DRM systems may include an Open Mobile Alliance (OMA) DRM system, a Marlin DRM system, and a Widevine DRM system. These DRM systems are common in encrypting digital content before delivery and granting an access right to the digital content, i.e., in using a license, but different not only in the language expressing the license or the format thereof, but also in the format of messages used to run DRM service. Therefore, if the DRM system used by the CP providing DRM content is different from the DRM system supported by a user terminal, incompatibility-related problems may occur.

The digital content is provided to the user terminal by various different delivery schemes. Among them, streaming service is service that provides digital content data in real time. The DRM technology may be applied to this streaming service, and may also be applied to adaptive streaming service that automatically adjusts a streaming rate or bit rate in order to optimize throughput depending on the access environment.

The adaptive streaming service is technology for optimizing a bit rate by analyzing the user's network environment. In this technology, a user terminal selects and plays, depending on its situation, segments of content divided into small segments based on a Hyper Text Transfer Protocol (HTTP) protocol, allowing the user to enjoy the content seamlessly or without delay.

The terms used for the adaptive streaming service may be defined as follows.

Content: creations such as movies, music and news, and their storage form

Content component: components constituting content (ex: video, audio, and subtitles)

Representation: representation form of content. For example, even though low-quality and high-quality representations may exist, their contexts are the same.

Media Presentation Description (MPD): it includes information that a client (or user terminal) receiving and processing content should detect in advance, such as time location, Uniform Resource Locator (URL) and size of the content corresponding to the files obtained by segmenting the entire content into segments with a proper size.

The adaptive streaming service provides representations obtained by encoding the same content and content components with different conditions, such as network bandwidth, resolution, and codec. The adaptive streaming service segments the entire length of content into several equal periods, segments again the periods into segments having a sufficiently short time (e.g., 1 to 10 seconds) (segmentation), and provides MPD information (serving as a manifest file) specifying a file name, a sequence number, a start time, a length, etc. of each segment.

To make it possible to properly decrypt their representations, segments consist of initialization segments having information for decoder configuration and media segments including segmented content components.

A user terminal first receives MPD information, determines which representation has been provided, determines the performance and capability of the client device, and the network speed, selects a proper representation, downloads their segments in sequence, and plays the downloaded segments.

If changeable variables such as the network bandwidth vary, i.e., if the network speed increases, the user terminal selects and plays segments of a representation made with a broader network bandwidth. As a result, though the quality varies with the network speed, the playback continues seamlessly.

Generally, when DRM technology is applied to the adaptive streaming service, a maximum of one DRM system may be supported in a fixed manner per streaming service or streaming content. A content server providing streaming service transmits MPD information expressed in an Extensible Markup Language (XML) to a user terminal.

The MPD information, basic information about content in service, includes information about a type of the service, a valid period of the service, etc. The MPD information may further include information about one or more representations. The representation information indicates whether DRM is applied to the streaming service, and includes identification information for content provided by the streaming service and address information based on which content may be acquired.

Based on the MPD information, the user terminal selects representation information having a proper bit rate taking into account a network bandwidth in each period of streaming data.

FIG. 1 illustrates an example of representation information defined in an MPD according to the prior art. Referring to FIG. 1, the representation information includes bandwidth information 10 to which the representation is applied, content protection information 20 indicating whether DRM is applied, and information about the applied DRM system, and segment information 30 indicating identification information and acquired address information for each segment constituting the content provided by the streaming service. In FIG. 1, it can be seen that information about one DRM system is shown as "OMADRM" in the content protection information 20.

The user terminal determines a segment Uniform Resource Identifier (URI) included in the representation information of FIG. 1 and determines possibility of content protection. In the case of DRM-applied data, the user terminal additionally acquires a license using the representation information, decrypts the encrypted segments, and plays the content.

However, when one DRM system is represented in a representation as described above, it is impossible to support multiple DRM systems. For example, if protection systems having different security levels are required depending on the bit rate type (for high-resolution image, low-resolution image, etc.), even though multiple DRM systems may be used, it is not possible to support multiple DRM systems.

SUMMARY OF THE INVENTION

An aspect of an exemplary embodiment of the present invention is to provide a DRM service method and apparatus for supporting multiple DRM systems required in a representation in adaptive streaming service.

Another aspect of an exemplary embodiment of the present invention is to provide a DRM service method and apparatus capable of representing a required DRM system without redundant representation of DRM systems when multiple DRM systems required in each representation or content component are redundant in adaptive streaming service.

In accordance with one aspect of the present invention, there is provided an apparatus for providing a Digital Rights Management (DRM) service. The apparatus includes a Media Presentation Description (MPD) information configurer for determining a DRM system required in each of representations of content provided by an adaptive streaming service, classifying the representations into one or more groups according to predetermined criteria, and configuring MPD information by inserting content protection information including representation group information representing classified groups and information about DRM systems corresponding to the representation group information; and a communication unit for transmitting the MPD information to a user terminal receiving the content.

In accordance with another aspect of the present invention, there is provided a method for providing a Digital Rights Management (DRM) service. The method includes determining a DRM system required in each of representations of content provided by an adaptive streaming service; classifying the representations into one or more groups according to predetermined criteria, and generating representation group information representing the classified groups; configuring Media Presentation Description (MPD) information by inserting content protection information including the representation group information and information about DRM systems corresponding to the representation group information; and transmitting the MPD information to a user terminal receiving the content.

In accordance with further another aspect of the present invention, there is provided a user terminal apparatus for providing a Digital Rights Management (DRM) service. The apparatus includes a transceiver for receiving Media Presentation Description (MPD) information for content provided by an adaptive streaming service; a media composition module for checking, from the MPD information, representation group information representing a combination of at least one representation among representations of the content, and determining multiple DRM systems applied for decryption of the content by analyzing content protection information corresponding to the representation group information; a DRM selector for selecting a DRM satisfying a predetermined condition from among the determined DRM systems; and a decrypter for decrypting the content using the selected DRM.

In accordance with yet another aspect of the present invention, there is provided a method for providing a Digital Rights Management (DRM) service in a user terminal apparatus. The method includes receiving Media Presentation Description (MPD) information for content provided by an adaptive streaming service; checking, from the MPD information, representation group information representing a combination of at least one representation among representations of the content; determining multiple DRM systems applied for decryption of the content by analyzing content protection information corresponding to the representation group information; selecting a DRM satisfying a predetermined condition from among the determined DRM systems; and decrypting the content using the selected DRM.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 1 illustrates an example of representation information defined in an MPD according to the prior art;

FIG. 6 illustrates content protection information included in a representation level in MPD according to an embodiment of the present invention;

FIGS. 7A and 7B illustrate content protection information included in a media composition level in MPD according to an embodiment of the present invention;

FIG. 8 illustrates content protection information included in an MPD level according to an embodiment of the present invention;

Throughout the drawings, the same drawing reference numerals will be understood to refer to the same elements, features and structures.

DETAILED DESCRIPTION OF EXEMPLARY EMBODIMENTS

Preferred embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

The present invention provides content to which multiple DRM systems are applied in adaptive streaming service. The present invention may also provide information about multiple DRM systems applied to the content, and download information based on which at least one DRM system may be downloaded. Particularly, in providing content by adaptive streaming service, an adaptive streaming service provider determines a DRM system required in each representation of content, groups representations according to predetermined criteria, and provides content protection information including information about multiple DRM systems required for each representation group. The criteria predetermined to group representations may include content attributes (such as video and audio), content performance including a resolution such as High Definition (HD) class and Standard Definition (SD) class, and content play media type (such as media for TV, and media for mobile).

Upon receiving content by adaptive streaming service, a user terminal (or client) first determines multiple DRM systems for each representation group of content by analyzing content protection information of the content. As for the DRM systems supported by the user terminal among the multiple DRM systems, the user terminal decrypts and plays the content using the DRM system. As for the DRM systems not supported by the user terminal, the user terminal downloads the DRM system from an external DRM server, installs the downloaded DRM system, and decrypts and plays the content using the installed DRM system.

In other words, in order to solve the problem that only one DRM system is supported for each of representations in adaptive streaming service, the present invention supports all of multiple DRM systems required in each of representations, defines representations in groups according to predetermined criteria, and represents required DRM systems without redundant representation of DRM systems for multiple DRM systems required for a specific group, thus enabling adaptive streaming service.

Figure 2:
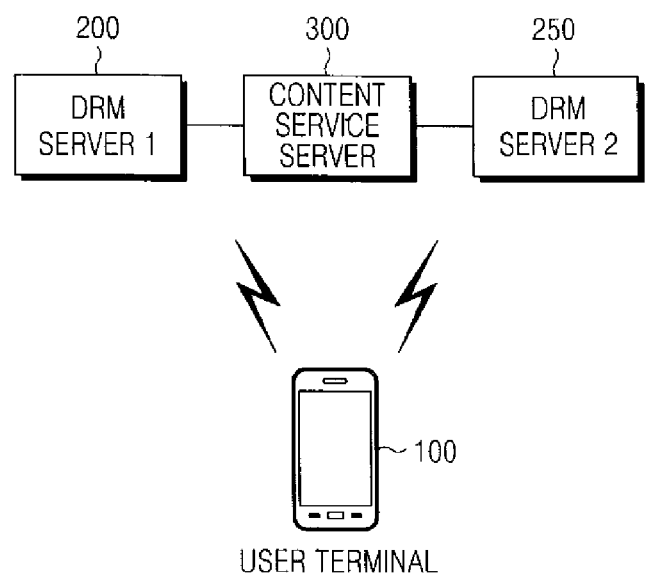
FIG. 2 illustrates a configuration of an adaptive streaming service system according to an embodiment of the present invention.

The present invention will be described in detail below in conjunction with an adaptive streaming service system. FIG. 2 illustrates a configuration of an adaptive streaming service system according to an embodiment of the present invention.

Referring to FIG. 2, the adaptive streaming service system includes a content server (or content service server) 300, DRM servers (or DRM service servers) 200 and 250, and a user terminal 100.

The DRM servers 200 and 250 may include a first DRM server 200 and a second DRM server 250, each of which generates and manages a license corresponding to the content in cooperation with the content server 300, and provides the license to the user terminal 100. The license includes an encryption key used to decrypt encrypted DRM content and data specifying access rights (e.g., the number of and period of accesses, access condition, etc.) to the content. Each of the first and second DRM servers 200 and 250 provides the user terminal 100 with a DRM system module capable of installing a DRM agent corresponding to the DRM system used to generate a license.

It is assumed that the first and second DRM servers 200 and 250 are different only in that they are server devices supporting different types of DRM systems, but the two server devices 200 and 250 perform the operation proposed by the present invention in a similar way. For example, while the first DRM server 200 may be a server device supporting an OMA DRM system, the second DRM server 250 may be a server device supporting a Marlin DRM system. Although the OMA DRM system and the Marlin DRM system will be considered by way of example in the present invention, other DRM systems may also be supported. In an alternative embodiment of the present invention, one server device may be configured to include both the first and second DRM servers 200 and 250.

The content server 300 is a device for providing a variety of digital content to the user terminal 100 having subscribed to multimedia service, and for managing information about users having subscribed to the service and information about the related user terminal 100, and may support adaptive streaming service. This content server 300 provides the user terminal 100 with information about the DRM system applied to adaptive streaming service.

In particular, the content server 300 receives DRM information from the DRM servers 200 and 250 and provides the user terminal 100 with information about the DRM system applied to adaptive streaming service. Specifically, in providing content by adaptive streaming service, the content server 300 determines a DRM system required in each of representations of the content in cooperation with the DRM servers 200 and 250, groups the representations according to predetermined criteria, and provides content protection information including information about multiple DRM systems required for each representation group.

The content protection information, information generated for DRM of specific content in response to the specific content in an MPD, may include DRM identification information and license acquisition information. The content protection information may also include DRM download information or a license itself.

The DRM identification information is identification information for the DRM system used for generation of the license. The license acquisition information is information related to the location where the user terminal 100 may download the license. The DRM download information is information related to the location where the user terminal 100 may download the DRM system module corresponding to the DRM system used for generation of the license.

The content server 300 converts the content protection information into the format the user terminal 100 may handle, and transmits the converted information to the user terminal 100. In accordance with an embodiment of the present invention, the content protection information may be delivered to the user terminal 100 using MPD information.

The MPD information, basic information about the content in service, includes information about a type of the service, a valid period of the service, etc. and may include information about at least one representation. The representation information indicates whether DRM is applied to the streaming service, and includes identification information for the content provided by the streaming service and address information by which the content may be acquired. In accordance with an embodiment of the present invention, the MPD information may include representation group information. The representation group information may refer to any one of information about a representation group generated by a combination of at least two representations among multiple representations according to predetermined criteria; information about media composition obtained by defining multiple representation groups as one media composition; and information about media composition obtained by defining multiple representations as one media composition. The predetermined criteria may include content attributes (such as video and audio), content quality corresponding to a resolution such as HD class and SD class, and content play media type (such as media for TV, and media for mobile). Other criteria unmentioned herein may also be applied.

The user terminal 100 is a device for consuming content by requesting, receiving and playing content by adaptive streaming service, and may include, for example, a personal computer (PC), a television (TV), a mobile phone, a Personal Multimedia Player (PMP), a music file player, etc. Upon receiving content by adaptive streaming service, the user terminal 100 determines multiple DRM systems by analyzing content protection information provided by MPD information. As for the DRM system supported by the user terminal 100 among the multiple DRM systems, the user terminal 100 decrypts and plays content using the DRM system. As for the DRM systems unsupported by the user terminal 100, the user terminal 100 downloads the DRM system from an external DRM server, installs the downloaded DRM system, and decrypts and plays the content.

Structures and operations of the content server 300 and the user terminal 100 in the adaptive streaming service system will be described in more detail below.

Figure 3:
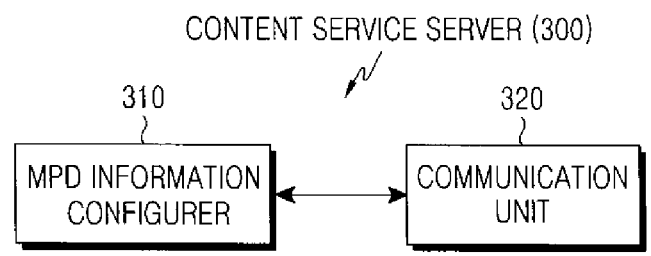
FIG. 3 illustrates a structure of a content server according to an embodiment of the present invention.
Figure 4:
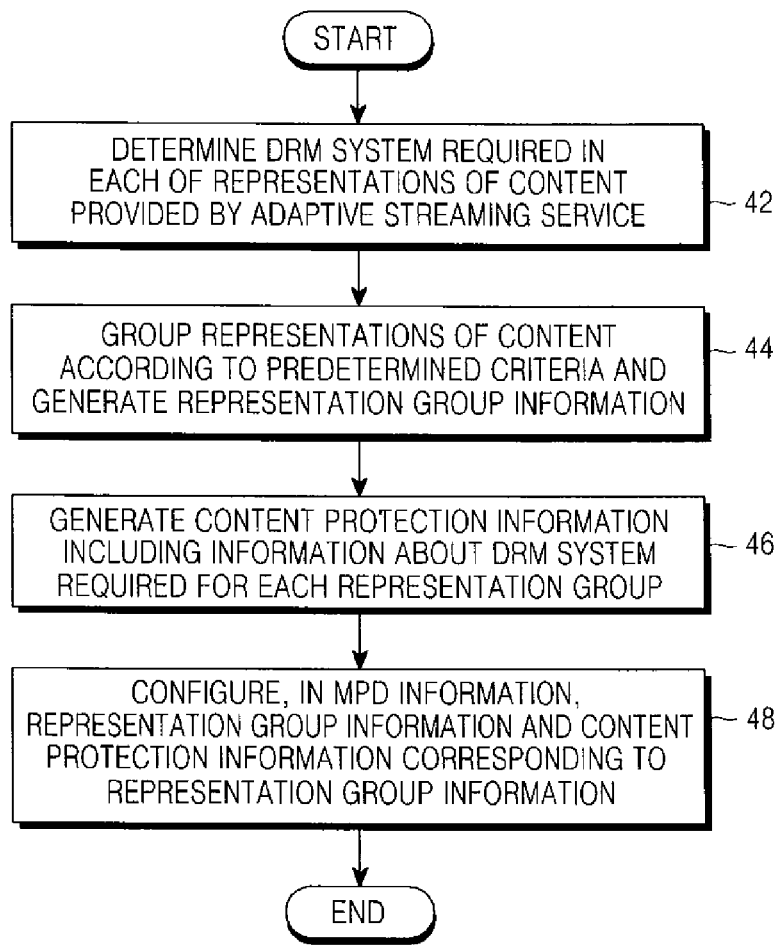
FIG. 4 illustrates an operation of a content server according to an embodiment of the present invention.

As to the structure and operation of the content server 300, FIG. 3 illustrates a structure of a content server according to an embodiment of the present invention, and FIG. 4 illustrates an operation of a content server according to an embodiment of the present invention. Referring to FIG. 3, the content server 300 includes an MPD information configurer 310 and a communication unit 320.

Referring to FIG. 4, the MPD information configurer 310 determines a DRM system required in each of representations corresponding to the content provided by adaptive streaming service in step 42.

In step 44, the MPD information configurer 310 groups representations according to predetermined criteria, and generates representation group information corresponding to the representation group. The predetermined criteria may include content attributes (such as video and audio), content quality such as HD class and SD class, and content play media type (such as media for TV, and media for mobile). Other criteria unmentioned herein may also be applied.

After generating the representation group information, the MPD information configurer 310 generates content protection information including information about the DRM system required for each representation group in step 46.

In step 48, the MPD information configurer 310 configures, in MPD information, representation group information and content protection information corresponding to the representation group, and provides the MPD information to the user terminal 100 through the communication unit 320. The content protection information includes information about the DRM systems corresponding to the representation group.

Figure 5A:
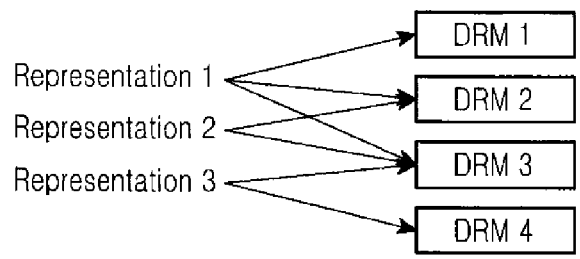
FIGS. 5A to 5C illustrate a representation group and DRM system information corresponding to the representation group according to an embodiment of the present invention.
Figure 5B:
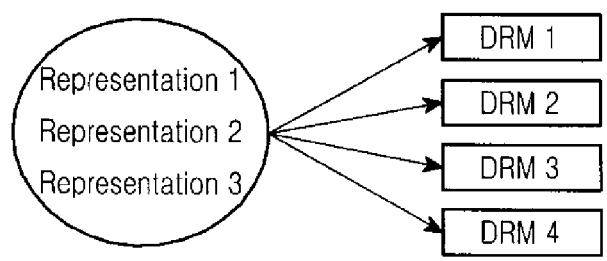
Figure 5C:
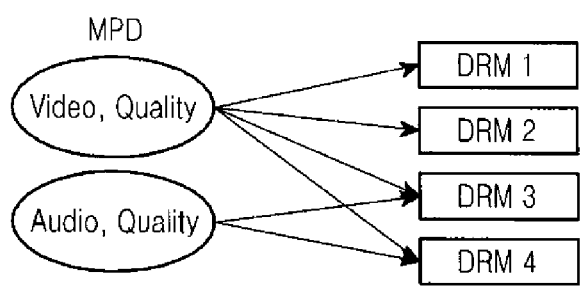

As regards the operation of the MPD information configurer 310, the representation group and the DRM systems associated with the representation group will be described in more detail. FIGS. 5A to 5C illustrate a representation group and DRM system information corresponding to the representation group according to an embodiment of the present invention.

FIG. 5A illustrates multiple DRM systems supported in each of representations. FIG. 5B illustrates multiple DRM systems supported for one representation group including multiple representations. FIG. 5C illustrates multiple DRM systems supported for each media composition including multiple representation groups.

If multiple DRM systems are supported in each of representations as in FIG. 5A, the user terminal 100 may be provided with first content protection information indicating that DRM1 and DRM3 are supported in a representation 1; second content protection information indicating that DRM2 and DRM3 are in a representation 2; and third content protection information indicating that DRM3 and DRM4 are supported in a representation 3. In this case, the same DRM system information may be redundantly provided to the user terminal 100 several times, because content protection information is provided to the user terminal 100 on a representation basis.

In an embodiment of the present invention, one representation group may be made by combining representations 1, 2 and 3 according to first criteria predetermined as shown in FIG. 5B, for example, according to the content attributes (such as video and audio) and the content quality, and content protection information may be provided, indicating that DRM1, DRM2, DRM3 and DRM4 are supported for the representation group.

In addition, as shown in FIG. 5c, multiple representation groups may be configured into media composition according to predetermined criteria, for example, according to the content attributes such as video and audio, and the content quality criteria, and content protection information supported for each media composition may be provided. Other criteria unmentioned herein may also be applied.

In accordance with an embodiment of the present invention, the content protection information may be provided in a representation level in MPD information, may be provided in a media composition level in MPD information, or may be provided in an MPD information level.

A description will now be made of a case where the content protection information is provided in a representation level in MPD information. FIG. 6 illustrates content protection information included in a representation level in MPD according to an embodiment of the present invention.

Referring to FIG. 6, reference numeral 62 represents content protection information, and reference numeral. 64 represents segment information. In detailed description of the content protection information 62, DRM identification information is represented by "schemeIdUri". License information is represented by "licenceInfos", and provides keys for decrypting encrypted content and URL for acquiring information about the number of and the time of consuming the content. DRM download information is represented by "downloadableDRMURI", and if the user terminal does not currently support the related DRM, URI information of a DRM system module is provided to allow the user terminal to download and installed the DRM system module. FIG. 6 shows a case where Representation ID is "1" and Group is "10", meaning that a representation with Representation ID="1" belongs to a representation group with Group="10", and indicating that information about multiple DRM systems such as "OMA" and "Marlin" is included in representation.

A description will now be made of a case where the content protection information is provided in a media composition level in MPD information. Multiple representation groups are defined as media composition, and content protection information corresponding to the defined media composition may be provided in a media composition level in MPD information.

An example that multiple representation groups are defined as media composition will be described with reference to Table 1 below.

TABLE 1

```
<MPD>
  <Period>
    <MediaCompositionGroup>
      <MediaComposition ID="1">
        <GroupInfo refID="10" description="video"/> //Video
        <GroupInfo refID="11" description="audio"/> //Audio
      </MediaComposition>
      <MediaComposition ID="2" description="For Mobile">
        <representationInfo refID="1"/> //160×120
        <representationInfo refID="2"/> //240×160
        <representationInfo refID="3"/> //320×240
      </MediaComposition>
    </MediaCompositionGroup>
    <Representation ID="1"
      Group="10" bandwidth="128000">...</Representation>
```

TABLE 1-continued

```
    <Representation ID="2" Group="10"
    bandwidth="256000">...</Representation>
    <Representation ID="3" bandwidth="512000">...</Representation>
    <Representation ID="4" Group="11">...</Representation>
    <Representation ID="5" Group="11">...</Representation>
  </Period>
</MPD>
```

Referring to Table 1, in the state where representations with Representation ID=1 and 2 are designated as a representation group with Group=10, like <Representation ID="1" Group="10"> and <Representation ID="2" Group="10">, and representations with Representation ID=4 and 5 are designated as a representation group with Group=11, like <Representation ID="4" Group="11"> and <Representation ID="5" Group="11">, representation groups with Group=11 and 12 may be described as media composition with media composition ID=1, like <MediaComposition ID="1">. The media composition with media composition ID=1 may include description indicating that a type of representations in the representation group with Group=10 is video, like <GroupInfo refID="10" description="video"/>.

If the multiple representation groups are defined as media composition in this way, content protection information corresponding to multiple representation groups may be provided in a media composition level in MPD information.

FIGS. 7A and 7B illustrate content protection information included in a media composition level in MPD according to an embodiment of the present invention.

FIG. 7A illustrates media composition configured by dividing representation groups according to the content type, i.e., video and audio, and FIG. 7B illustrates media composition configured by dividing representation groups according to the quality (or resolution), i.e., depending on to which of 160*120, 240*160, and 320*240 the quality belongs.

Referring to FIG. 7A, content protection information may be included in a media composition level in MPD information as represented by reference numeral 72. FIG. 7A shows an example that representations with Representation ID=1 and 2 are designated as a representation group with Group=1 and a representation with Representation ID=3 is designated as a representation group with Group=1. In addition, FIG. 7A shows an example that Group=1 means a representation group corresponding to description=Video and Group=2 means a representation group corresponding to description=Audio, like <GroupInfo refID="1"/>//Video and <GroupInfo refID="2"/>//Audio. The content protection information 72 of <MediaComposition ID="1"> with media composition ID=1 corresponding to representation groups with Group=1 and 2 means content protection information corresponding to representations with Representation ID=1, 2 and 3.

According to FIG. 7A, DRM systems A and B may be applied to a representation group with Group=1 corresponding to Video, and DRM system C may be applied to a representation group with Group=2 corresponding to Audio.

Referring to FIG. 7B showing a case where media composition is configured by dividing representation groups according to the quality, i.e., depending on to which of 160*120, 240*160, and 320*240 the quality belongs, content protection information may be included in a media composition level in MPD information as represented by reference numeral 74. FIG. 7B shows an example that as designated as representations with Representation=ID 1, 2 and 3 are designated as media composition with media composition ID=2. FIG. 7B shows an example that like <representationInfo refID="1"description="low"/>//160*120, <representationInfo refID="2"description="mid"/>//240*160, and <representationInfo refID="2"description="mid"/>//320*240, a representation with Representation ID=1 means a representation having performance of 'low' corresponding to quality=160*120, a representation with Representation ID=2 means a representation having performance of 'mid' corresponding to quality=240*160, and a representation with Representation ID=3 means a representation having performance of 'high' corresponding to quality=320*240.

A media composition <MediaComposition ID="2"> with media composition ID=2 corresponding to representations with Representation ID=1, 2 and 3 is for mobile, like description="For Mobile", and the content protection information 74 means content protection information corresponding to Representation ID=1, 2 and 3.

According to FIG. 7B, DRM system A may be applied to representations with Representation ID=1 corresponding to 'low' mobile terminal quality, DRM system B may be applied to representations with Representation ID=1 and 2 corresponding to 'low' and 'mid' mobile terminal qualities, and DRM system C may be applied to representations with Representation ID=3 corresponding to 'high' mobile terminal quality.

A description will now be made of a case where the content protection information is provided in an MPD level. FIG. 8 illustrates content protection information included in an MPD level according to an embodiment of the present invention.

Referring to FIG. 8, content protection information may be included in MPD information as represented by reference numeral 82. FIG. 8 shows a case where representations may be clearly identified by the content type (video, audio, etc.) and the content quality (low, mid, high).

According to FIG. 8, DRM system A may be applied to representations with content type=video and content quality=low, DRM system B may be applied to representations with content type=video and content quality=mid, and DRM system C may be applied to representations with content type=video and audio.

If the content server 300 provides MPD information including the configured content protection information to the user terminal 100 by means of the MPD information configurer 310 and the communication unit 320, then the user terminal 100 decrypts and plays the content depending on the content protection information in MPD information.

Figure 9:
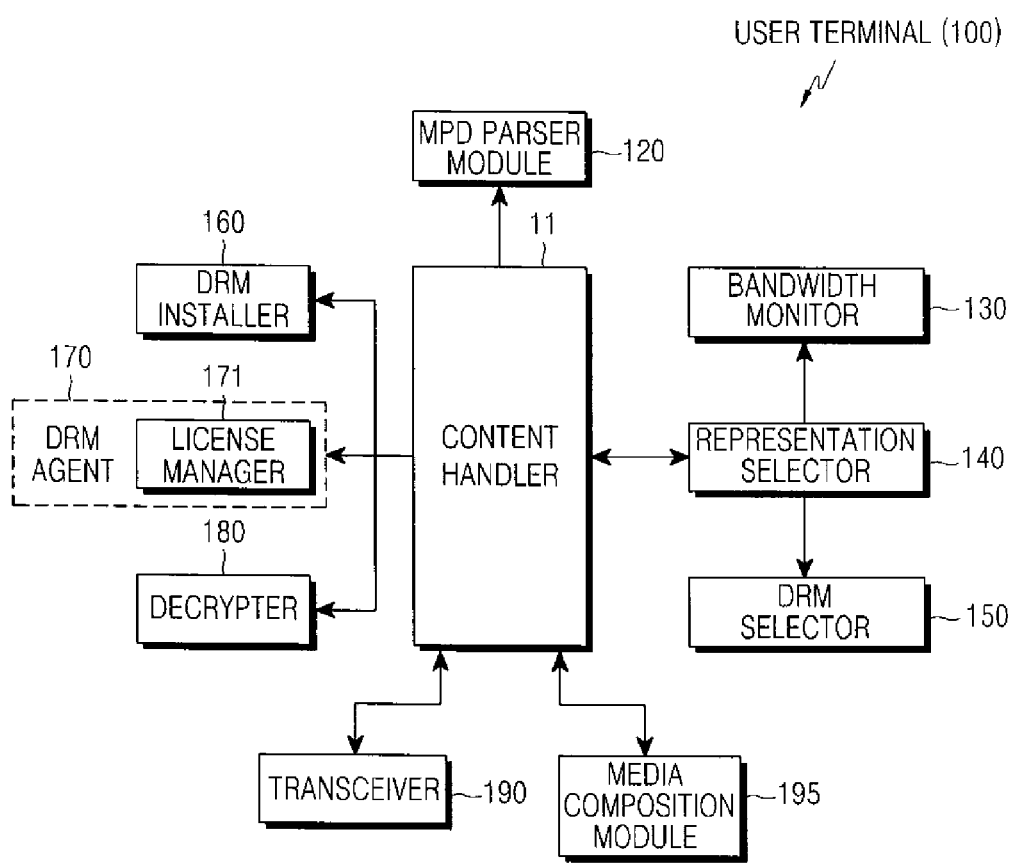
FIG. 9 illustrates a structure of a user terminal according to an embodiment of the present invention.

A detailed description will now be made of a structure of the user terminal 100. FIG. 9 illustrates a structure of a user terminal according to an embodiment of the present invention.

Referring to FIG. 9, the user terminal 100 includes a content handler 11, an MPD parser module 120, a bandwidth monitor 130, a representation selector 140, a DRM selector 150, a DRM installer 160, a DRM agent 170, a decrypter 180, a transceiver 190, and a media composition module 195.

The content handler 11 handles functions of the user terminal 100 by controlling the following components. The transceiver 190 transmits and receives messages or data to/from the network or other devices, and delivers the received messages or data to the content handler 11. The transceiver 190 transmits data and messages provided from the content handler 11 to the related network entities or devices.

The MPD parser module 120, under control of the content handler 11, parses MPD nodes in MPD information received from the content server 300 via the transceiver 190, and generates DRM objects for content protection information. The MPD parser module 120 delivers the parsed MPD information to the content handler 11. The content handler 11 delivers the MPD information to the representation selector 140.

The bandwidth monitor 130 checks the network bandwidth by monitoring the network state, and delivers the bandwidth information to the representation selector 140, thereby providing the criteria for representation selection.

Based on the information about the DRM system installation in the user terminal 100, the performance of the user terminal 100, and the DRM selection criteria, the DRM selector 150 selects DRM systems which are suitable to be used in playing the content to which multiple DRM systems are applied. The DRM selection criteria may be set in various different ways to select at least one of, for example, a DRM system currently installed in the user terminal 100, a DRM system preferred by the service provider providing the content, and a DRM system preferred by the user.

The representation selector 140 selects representations in a proper level by making reference to and comparing the network bandwidth, the DRM selection criteria and information about at least one representation included in MPD information. The information about the DRM system selected by the DRM selector 150 and the information about the representation selected by the representation selector 140 are provided to the content handler 11.

The DRM installer 160, under control of the content handler 11, downloads and installs a relevant DRM system module if a DRM agent corresponding to the DRM system selected by the DRM selector 150 is not installed in the user terminal 100. The DRM installer 160 may perform an authentication procedure with the DRM servers 200 and 250 by generating performance information/security verification information of the user terminal 100. The DRM agent 170, under control of the content handler 11, may perform a protocol of acquiring a license, and enables the content to be played according to the acquired license. In other words, the DRM agent 170 acquires a license from its license manager 171 and manages the acquired license. Depending on the access right included in the license, the DRM agent 170 allows the content to be accessed by the user terminal 100 and provides an encryption key to the decrypter 180. The DRM agent 170 is identified according to the type of the DRM system, and may be added by the DRM installer 160.

The decrypter 180, under control of the content handler 11, decrypts the encrypted content data based on the encryption key information of the license and the encryption information (e.g., initial vector and encryption algorithm) described in MPD information. Under control of the content handler 11, the decrypted content data is played by a multimedia player (not shown).

The media composition module 195, under control of the content handler 11, determines the applied DRM systems by checking representation group information in the MPD information parsed by the MPD parser module 120, and analyzing content protection information corresponding to the representation group information. For example, the media composition module 195 determines DRM systems applied to each representation group including multiple representations, or determines DRM systems applied to a media composition including multiple representation groups. The media composition module 195 provides information about the determined DRM systems to the content handler 11, allowing the content handler 11 to select a DRM system suitable to be used in playing the content to which multiple DRM systems are applied.

Figure 10:
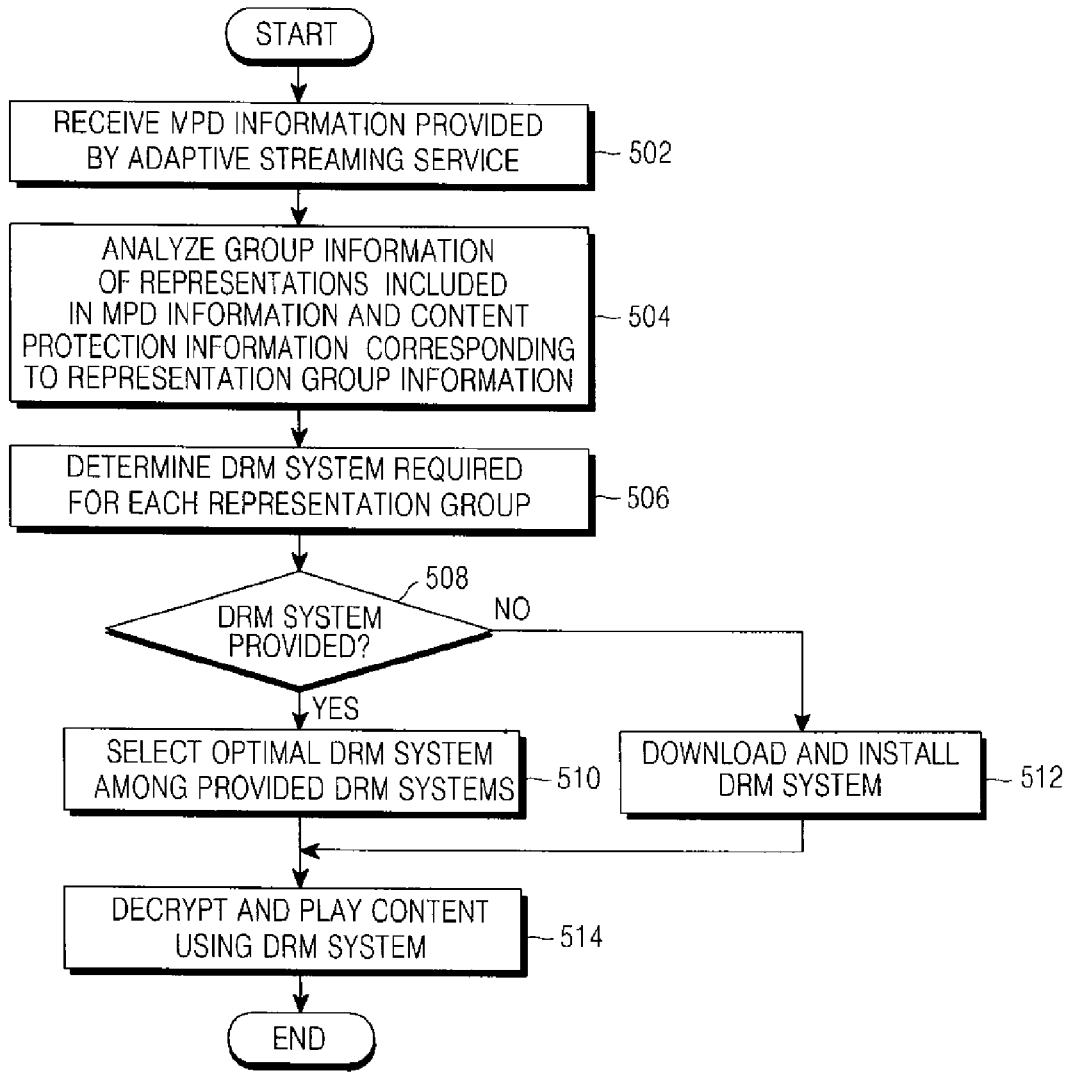
FIG. 10 illustrates an operation of a user terminal according to an embodiment of the present invention.

A description will now be made of a DRM service method in the user terminal 100. FIG. 10 illustrates an operation of a user terminal according to an embodiment of the present invention.

Referring to FIG. 10, the user terminal 100 receives MPD information provided by adaptive streaming service through the transceiver 190 in step 502. The MPD information includes group information of representations corresponding to the content and content protection information corresponding to the representation group information. In accordance with an embodiment of the present invention, for example, the representation group information may be information indicating a representation group made by a combination of at least one representation among multiple representations according to predetermined criteria, or may be information indicating the media composition obtained by defining multiple representation groups. The predetermined criteria may include content types or attributes (such as video and audio), content quality corresponding to a resolution such as HD class and SD class, and content play media type (such as media for TV, and media for mobile). Other criteria unmentioned herein may also be applied.

In step 504, the user terminal 100 analyzes representation group information included in MPD information and content protection information corresponding to the representation group information. The user terminal 100 may analyze content protection information included in a media composition level, or may analyze content protection information included in an MPD level.

After the analysis of the content protection information is completed, the user terminal 100 determines a DRM system required for each representation group in step 506. For example, the user terminal 100 may determine a DRM system required by a representation group made by a combination of at least one representation among multiple representations according to predetermined criteria. The user terminal 100 may also determine a DRM system required by a media composition obtained by defining multiple representation groups or multiple representations.

After determining the required DRM system, the user terminal 100 determines in step 508 whether the required DRM system is a DRM system provided (supported) in the user terminal 100. If the required DRM system is a provided DRM system, the user terminal 100 selects an optimal DRM system among the provided DRM systems in step 510. However, if the required DRM system is not a provided DRM system, the user terminal 100 downloads a DRM system from the DRM server based on downloadableDRMInfo in the content protection information, installs the downloaded DRM system, and selects the optimal DRM system, in step 512. The user terminal 100 may select the optimal DRM system taking into account the current terminal performance, the bandwidth, and the user settings.

In step 514, the user terminal 100 decrypts the content using the selected DRM system and plays the decrypted content. The user terminal 100 performs the content playback after obtaining license-related information in the content protection information using the selected DRM system, and acquiring information for decrypting content based on the license-related information.

As is apparent from the foregoing description, according to the present invention, multiple DRM systems required in each of representations are set to be supported all in adaptive streaming service. Representations are defined as a group according to predetermined criteria and multiple DRM systems required for the group are set to represent the required DRM system without redundant representation of DRM systems, making it possible to provide more the efficient DRM service. In addition, different security requirements may be satisfied according to various criteria such as content type, content quality, and content play media.

While the invention has been shown and described with reference to certain exemplary embodiments thereof, it will be understood by those skilled in the art that various changes in form and details may be made therein without departing from the spirit and scope of the invention as defined by the appended claims and their equivalents.

For example, although representations are grouped according to predetermined criteria such as the content type, the content quality and the content play media in an embodiment of the present invention, the representations may be grouped according to other criteria. Although a representation group is defined as a media composition in the present invention, the representation group may be defined in another manner.

What is claimed is:

1. A content service server for providing a Digital Rights Management (DRM) service, comprising:
    a Media Presentation Description (MPD) information controller for determining a DRM system required in each of representations of content provided by an adaptive streaming service, classifying the representations into one or more groups according to predetermined criteria, and configuring MPD information by inserting content protection information including representation group information representing classified groups and information about DRM systems corresponding to the representation group information; and
    a transceiver for transmitting the MPD information to a user terminal,
    wherein the representation group information is information about each of representation groups generated by a combination of at least two representations among representations of the content according to predetermined criteria.

2. The content service server of claim 1, wherein the representation group information is media composition information as which the representation groups are defined.

3. The content service server of claim 1, wherein the representation group information is media composition information as which each of representation groups is defined, which are generated by a combination of at least two representations among representations of the content according to predetermined criteria.

4. The content service server of claim 1, wherein the predetermined criteria includes at least one of a type of the content, a quality of the content, and a type of content play media.

5. A method for providing a Digital Rights Management (DRM) service, comprising:
    Determining, by a Media Presentation Description (MPD) information controller, a DRM system required in each of representations of content provided by an adaptive streaming service;
    classifying, by the Media Presentation Description (MPD) information controller, the representations into one or more groups according to predetermined criteria, and generating representation group information representing the classified groups;
    configuring, by the Media Presentation Description (MPD) information controller, Media Presentation Description (MPD) information by inserting content protection information including the representation group information and information about DRM systems corresponding to the representation group information; and
    transmitting, by a transceiver, the MPD information to a user terminal receiving the content,
    wherein the representation group information is information about each of representation groups generated by a combination of at least two representations among representations of the content according to predetermined criteria.

6. The method of claim 5, wherein the representation group information is media composition information as which the representation groups are defined.

7. The method of claim 5, wherein the representation group information is media composition information as which each of representation groups is defined, which are generated by a combination of at least two representations among representations of the content according to predetermined criteria.

8. The method of claim 5, wherein the predetermined criteria includes at least one of a type of the content, a quality of the content, and a type of content play media.

9. A user terminal apparatus for providing a Digital Rights Management (DRM) service, comprising:
    a transceiver for receiving Media Presentation Description (MPD) information for content provided by an adaptive streaming service;
    a media composition controller for checking, from the MPD information, representation group information representing a combination of at least one representation among representations of the content, and determining multiple DRM systems applied for decryption of the content by analyzing content protection information corresponding to the representation group information;
    a DRM selector for selecting a DRM satisfying a predetermined condition from among the determined DRM systems; and
    a decrypter for decrypting the content using the selected DRM,
    wherein the representation group information is information about each of representation groups generated by a combination of at least two representations among representations of the content according to predetermined criteria.

10. The user terminal apparatus of claim 9, wherein the representation group information is media composition information as which the representation groups are defined.

11. The user terminal apparatus of claim 9, wherein the representation group information is media composition information as which each of representation groups is defined, which are generated by a combination of at least two representations among representations of the content according to predetermined criteria.

12. The user terminal apparatus of claim 9, wherein the predetermined criteria includes at least one of a type of the content, a quality of the content, and a type of content play media.

13. A method for providing a Digital Rights Management (DRM) service in a user terminal apparatus, comprising:
    receiving, by a transceiver, Media Presentation Description (MPD) information for content provided by an adaptive streaming service;
    checking, by a media composition controller, from the MPD information, representation group information representing a combination of at least one representation among representations of the content;
    determining, by the media composition controller, multiple DRM systems applied for decryption of the content by analyzing content protection information corresponding to the representation group information;

selecting, by a DRM selector, a DRM satisfying a predetermined condition from among the determined DRM systems; and decrypting, by a decrypter, the content using the selected DRM, wherein the representation group information is information about each of representation groups generated by a combination of at least two representations among representations of the content according to predetermined criteria.

14. The method of claim 13, wherein the representation group information is media composition information as which the representation groups are defined.

15. The method of claim 13, wherein the representation group information is media composition information as which each of representation groups is defined, which are generated by a combination of at least two representations among representations of the content according to predetermined criteria.

16. The method of claim 13, wherein the predetermined criteria includes at least one of a type of the content, a quality of the content, and a type of content play media.

\* \* \* \* \*